(12) United States Patent  (10) Patent No.: US 12,636,841 B2
Seneviratne et al.  (45) Date of Patent: May 26, 2026

(54) IN-PROCESS INSPECTION TOOL

(71) Applicant: Wichita State University, Wichita, KS (US)

(72) Inventors: Waruna Seneviratne, Wichita, KS (US); Tharaka Nandakumara, Wichita, KS (US)

(73) Assignee: WICHITA STATE UNIVERSITY, Wichita, KS (US)

( * ) Notice: Subject to any disclaimer, the term of this patent is extended or adjusted under 35 U.S.C. 154(b) by 70 days.

(21) Appl. No.: 18/444,936

(22) Filed: Feb. 19, 2024

(65) Prior Publication Data

US 2024/0278510 A1    Aug. 22, 2024

Related U.S. Application Data

(60) Provisional application No. 63/485,703, filed on Feb. 17, 2023.

(51) Int. Cl.
B29C 70/38 (2006.01)
G01N 21/84 (2006.01)
G01N 21/88 (2006.01)

(52) U.S. Cl.
CPC ....... B29C 70/384 (2013.01); G01N 21/8851 (2013.01); G01N 2021/8472 (2013.01)

(58) Field of Classification Search
CPC ... B29C 70/384; B29C 70/388; B29C 70/386; B29C 70/382; B29C 70/38; G01N 21/8851; G01N 2021/8472
See application file for complete search history.

(56) References Cited

U.S. PATENT DOCUMENTS

| | | | |
|---|---|---|---|
| 10,899,089 B2 | 1/2021 | Webb | |
| 12,165,387 B2 | 12/2024 | Blom-Schieber et al. | |
| 12,205,270 B2 | 1/2025 | Winfree et al. | |
| 2006/0191622 A1* | 8/2006 | Ritter | G01N 25/72 |
| | | | 156/379 |
| 2018/0017499 A1* | 1/2018 | Monchalin | G01B 9/02091 |
| 2022/0118624 A1* | 4/2022 | Tyson, II | B25J 9/1697 |

FOREIGN PATENT DOCUMENTS

EP        3628473 B1    2/2022

OTHER PUBLICATIONS

Joshua Cemenska, Todd Rudberg, Michael Henscheid, "Automated In-process inspection system for AFP machines", Journal, Sep. 15, 2015, 7 pages, 8(2):303-309, SAE International.

(Continued)

*Primary Examiner* — George R Koch
(74) *Attorney, Agent, or Firm* — Stinson LLP

(57)        ABSTRACT

A tool for use with Automated Fiber Placement (AFP) machines and systems for use in in-process inspection of composite parts. The AFP system uses a robot, fiber guide, compaction roller, heating system, and an in-process inspection tool. The in-process inspection tool utilizes at least one profiler housed within a support bracket, which mounts the profiler on an AFP head of the AFP system such that the profiler does not interfere with the AFP layup, but outputs an in-process inspection signal representing a surface profile of a fiber strip as it is placed onto a molding for a composite part by the AFP head.

21 Claims, 15 Drawing Sheets

(56) References Cited

OTHER PUBLICATIONS

Christopher Sacco, Anis Bas Radwan, Ramy Harik, Michael Van Tooren, "Automated fiber placement defects: automated inspection and characterization", May 21, 2018, Article, 13 pages, McNAIR Center for Aerospace Innovation and Research, Department of Mechanical Engineering, College of Engineering and Computing, University of South Carolina, 1000 Catawba St., Columbia, SC, 29201, USA.

Mathew Godbold, Christopher Sacco, Roudy Wehbe, "An End-To-End AFP Defect Inspection and Analysis Tool", Conference Paper, Jan. 2022, 12 pages, DOI: 10.33599/nasampe/s.22.0729, ResearchGate.

"Ingersolls ACSIS: Automated Composite Structure Inspection System", Video, May 15, 2019, 3:35 minutes, Ingersoll Machine Tools.

* cited by examiner

IN-PROCESS INSPECTION TOOL

CROSS-REFERENCE TO RELATED APPLICATION

This application claims priority to U.S. Provisional Patent Application No. 63/485,703 which is hereby incorporated by reference in its entirety.

This invention was made with government support under Grant No. N00014-21-1-2678, awarded by the Office of Naval Research. The government of the United States has certain rights in the invention.

FIELD

This disclosure generally pertains to automated fiber placement (AFP) systems of the type used to form composite parts by using an automated robotic system including a fiber application head to apply strips of fibers to a molding in strip-by-strip fashion.

BACKGROUND

Automated fiber placement (AFP) is a composite manufacturing technique used to fabricate complex advanced air vehicle structures that are lightweight with superior qualities. The AFP process is intricate and complex with various phases of design, process planning, manufacturing, and inspection. The AFP process consists of a gantry/robotic system with an attached fiber placement head. The AFP head enables multiple strips of composite material, or tows, to be laid onto a tool surface. Adhesion between the incoming tows and substrate is ensured by using appropriate process conditions such as heating, compaction, and tensioning systems. A series of tows forms a course, courses are then combined to create a ply, and multiple plies create a laminate.

Although AFP has significantly improved the production rate and quality of laminate structures, the integration of multiple disciplines such as robotics, nondestructive inspection (NDI), and process modeling presents challenges. As the tows from multiple spools are laid down, a wide variety of defects, such as gaps, overlaps, missing tows, twisted tows, puckers or wrinkles, foreign object debris (FOD), and fiber bridging, may be present. Since these defects can have a significant impact on the structural margin of safety, it is important to detect and repair such defects. Quality assurance through inspections and process controls are essential to ensure that material is laid up and processed according to specification without process-induced defects. Currently, AFP processes are interrupted after each layer so that the layup can be manually inspected for defects. This manual inspection process can consume 20-70 percent of the total production time, which diminishes the benefits of automation that would otherwise improve the production rate. In addition, manual inspection processes depend heavily on operator skill and training.

Current industry standard for inspection is primarily visual/manual, which can be inconsistent and subject to human error. Although AFP significantly improves the production rate and quality, a lack of reliable in-process inspection techniques results in intermittent interruptions (20-70% of the production time) for manual inspections. In addition, manual inspection processes are very time intensive, require expert knowledge, and reduce traceability in determining the quality of layup. The time cost of manual inspection is significant, with inspection time growing with the size of each part. This makes producing large scale composites increasingly time and cost prohibitive. Moreover, due to low contrast between the substrate and incoming tows, visual identification of defects has proven to be difficult.

Although thermal imaging, laser profiling, eddy current inspection and other non-destructive testing (NDT) techniques have been employed to ease the difficulty of inspection, improved accuracy and speed of rapid in-process, or in-line, automated inspection is needed.

SUMMARY

In one aspect, an in-process inspection tool for an AFP system for making a composite part is disclosed, the inspection tool includes a profiler configured to output a signal indicating a surface profile, and a support bracket is configured to mount the profiler on the head of the AFP system such that the profiler is configured to output an in-process inspection signal representing a surface profile of a fiber strip as the AFP head places the fiber strip on a molding for the composite part.

The fiber strip has a width, and the in-process inspection signal represents the surface profile of the fiber strip along an entirety of the width. The AFP system may use an industrial robot to move the AFP head along a range of motion for fiber placement.

The profiler can output the in-process inspection signal anywhere along the range of motion for fiber placement. The support bracket mounts the tool to the AFP head so that the tool does not interfere with the molding anywhere along the range of motion for fiber placement. The support bracket may have a bracket mount for mounting the support bracket on the AFP head and a profiler mount for mounting the profiler on the support bracket. The bracket mount may attach to a chassis of the AFP head above a fiber roller and an air knife of the AFP head.

The main profiler mounting plate may extend generally in a profiler mounting plane and may have a mounting side on which the main profiler mounting plate mounts to the profiler. The first plate section and a second plate section of the main profiler mounting plate may be joined to the first plate section at a vertex, the first plate section and the second plate section defining an included angle at the vertex on the mounting side of the main profiler mounting plate, the included angle being less than 180°.

In one embodiment, the profiler may have a first profiler mounted on the first plate section and a second profiler mounted on the second plate section. The first profiler and second profilers, each having a scanning range, may be mounted so that the first scanning range and the second scanning range overlap.

The bracket mount may have a mounting foot extending generally in a mounting foot plane, the mounting foot plane being oblique to the profiler mounting plane. The mounting foot has a proximal side configured to engage a chassis of the AFP head and a distal side opposite the proximal side, the mounting foot plane and the profiler mounting plane defining an included angle between the distal side of the mounting foot and the mounting side of the main profiler mounting plate in an inclusive range of from 70 to 90 degrees between the proximal side and the distal side.

In another aspect, an AFP system is disclosed, the AFP system may have an AFP head with a chassis, a fiber guide operatively mounted on the chassis for guiding a strip of resin-impregnated fibers onto a molding, a compaction roller operatively mounted on the chassis such that the compaction roller is spaced apart from the fiber guide in a trailing direction for compacting the strip onto the molding, and a heating system mounted on the chassis for heating the strip as it is compacted onto the molding.

The support bracket mounts the in-process inspection tool on the chassis such that the profiler can transmit a profiling beam along a beam axis to the fiber strip at a location spaced apart from the compaction roller in the trailing direction. The beam axis is angled to extend from the profiler toward the compaction roller as the beam axis extends from the profiler toward the fiber strip.

Other aspects will be in part apparent and in part pointed out hereinafter.

BRIEF DESCRIPTION OF THE DRAWINGS

Corresponding parts are given corresponding reference characters throughout the drawings.

DETAILED DESCRIPTION

This disclosure generally pertains to automated fiber placement (AFP) systems of the type used to form composite parts by using an automated robotic system including a fiber application head to apply strips of fibers to a molding in strip-by-strip fashion. Examples of these types of AFP systems are described in U.S. Pat. No. 8,733,417 and U.S. Patent Application Publication No. 2020/0361164. Commercially, these types of automated fiber placement systems are available from Coriolis Composites SAS, Electroimpact Inc., and Mikrosam, for example. Those skilled in the art will recognize that, in comparison with conventional composite manufacturing systems, AFP systems can automate the manufacture of more complex and intricate parts because they allow for a much greater degree of control over how fibers are laid up in the composite.

Figure 1:
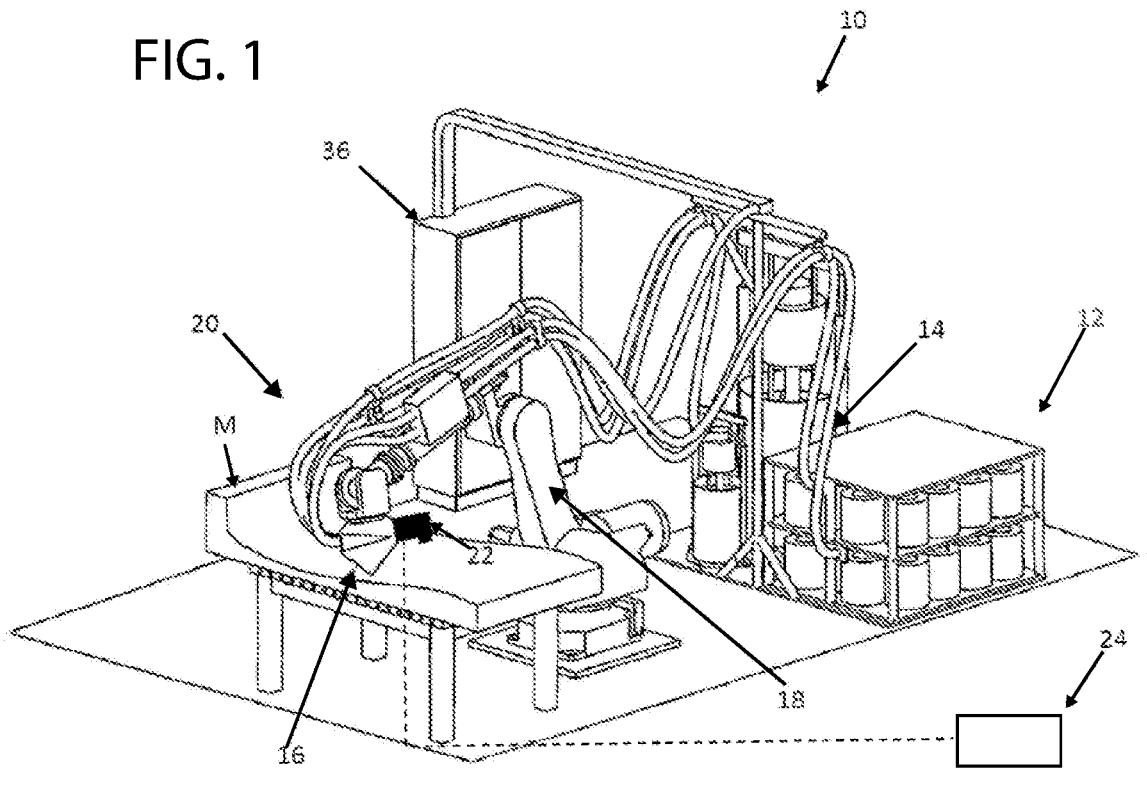
FIG. 1 is a perspective of an AFP system.

Referring to FIG. 1, an exemplary embodiment of an AFP system in accordance with the scope of the present disclosure is indicated at reference number 10. The AFP system generally comprises a fiber storage facility 12, a fiber conveyor 14, an AFP head 16, a robot 18, and an in-process inspection system 20 including an in-process inspection tool 22 mounted on the AFP head and an automated inspection module 24. The primary focus of this disclosure is the in-process inspection system 20. The remainder of the AFP system can encompass any AFP technology that is capable of automatically applying strips of fiber in strip-by-strip fashion to a molding to build a composite part.

Broadly speaking the fiber placement components of the AFP system 10 function as follows. The fiber storage facility 12 comprises one or more rolls of fiber tows that can be unwound to dispense fiber for use in an AFP process. The fiber conveyor 14 comprises flexible tubes through which fiber tows are conveyed from the fiber storage facility 12 to the AFP head 16. The AFP head 16 is mounted on the robot 18 so that the robot can move the AFP head along a molding M, which includes an underlying mold that typically defines a complex surface geometry for a composite part and any previously placed fiber strips. The AFP head 16 is broadly configured for guiding the fibers from the conveyor tubes to form a strip of fibers and placing the strip of fibers on the molding M in a predefined fiber orientation. As is understood by those skilled in the art, the AFP head 16 includes a large number of components, some of which are not illustrated because they are ancillary to the present disclosure. For example, the AFP head 16 suitably comprises fiber tensioners, fiber gatherers, and at least one fiber cutter that are not specifically illustrated in the drawings of this disclosure.

Figure 2:
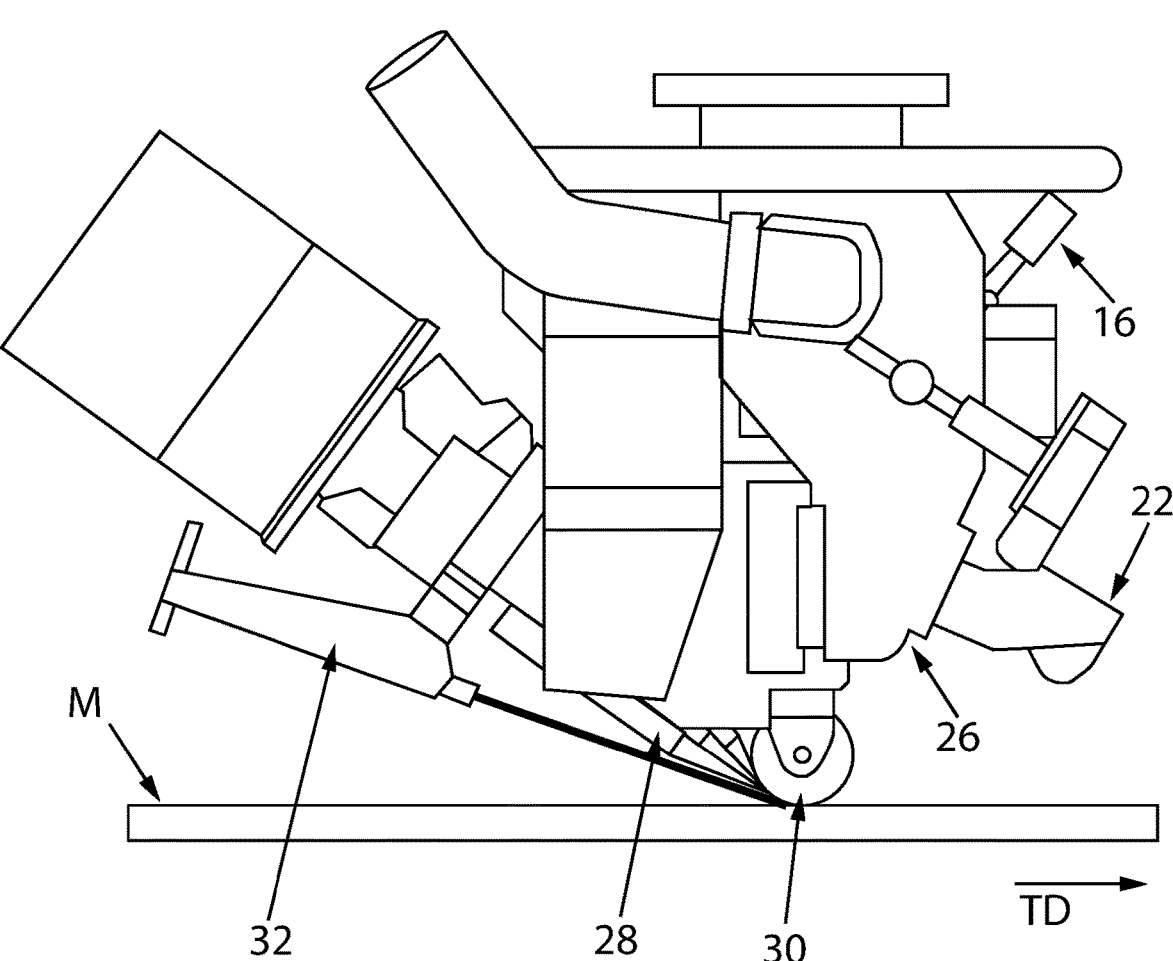
FIG. 2 is a right-side elevation of an inspection tool mounted on an AFP head.
Figure 3:
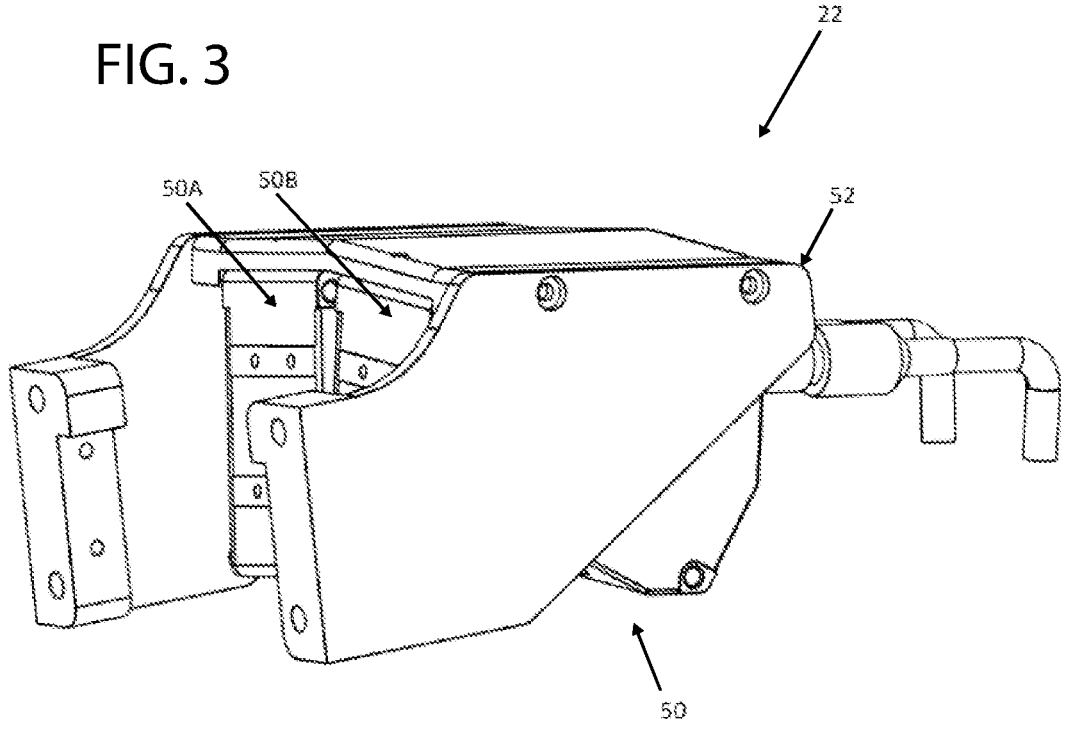
FIG. 3 is a rear perspective of the inspection tool.
Figure 4:
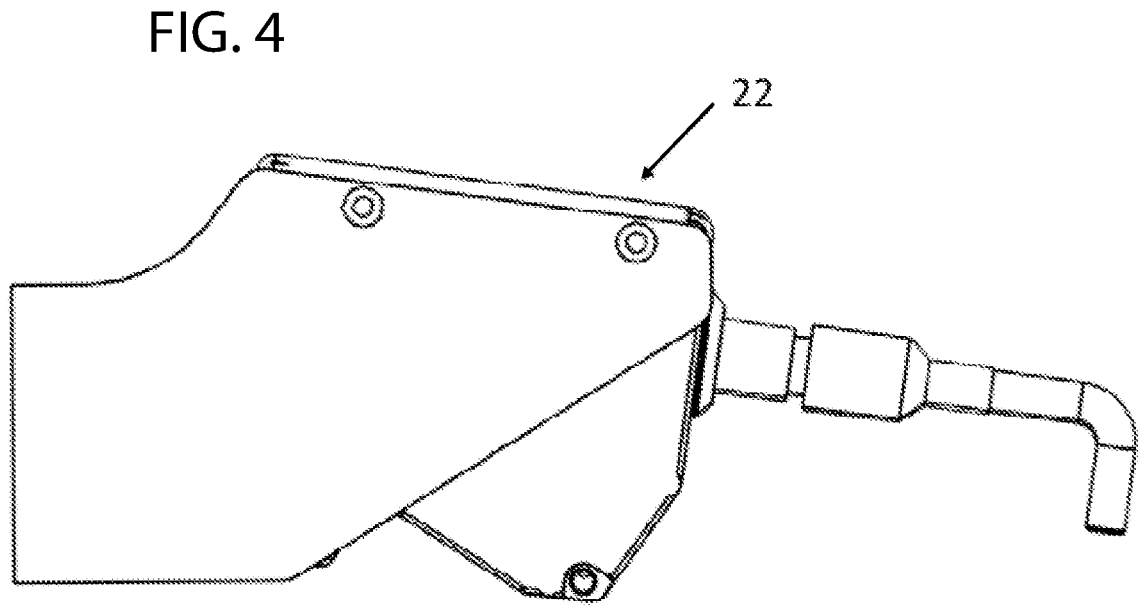
FIG. 4 is a right-side elevation of the inspection tool.
Figure 5:
FIG. 5 is a bottom plan view of the inspection tool.
Figure 5:
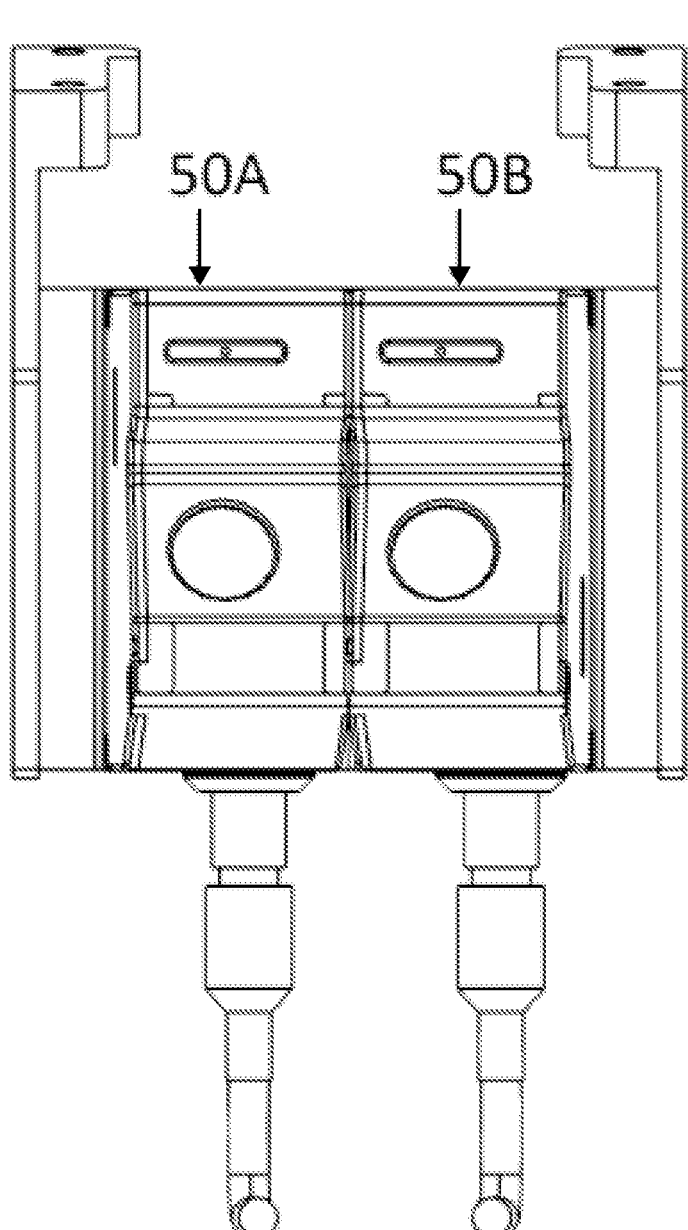

Referring to FIG. 2, the illustrated AFP head 16 comprises a chassis 26. A fiber guide 28 is operatively mounted on the chassis 26 for guiding a strip of resin-impregnated fibers toward the molding M as the robot 18 moves the AFP head 16 along the molding. A compaction roller 30 is operatively mounted on the chassis 26 such that the compaction roller is spaced apart from the fiber guide in a trailing direction TD for compacting the fiber strip onto the molding M. A heating system 32 is mounted on the chassis 26 for heating the fiber strip as it is compacted onto the molding M. The heating system 32 heats the fibers before they are compacted by the compacting roller 30 to soften the resin and promote adhesion of the compacted strip to the underlying molding.

As explained above, the AFP system 10 is capable of forming composite parts with complex geometries and/or complex fiber layup patterns. To enable formation of complex and intricate composite parts the robot 18 can comprise a multi-axis industrial robot for moving the AFP head 16 through an extensive range of motion, as shown in FIG. 1. For example, in one or more embodiments, the robot 18 comprises a six-axis industrial robot arm. In certain embodiments, the robot 18 can comprise a seven-axis industrial robot, a gantry system, or the like. Regardless of the robot type, with the AFP head 16 operatively coupled to the end of the robot 18, the robot should have an extensive, but finite, range of motion along which the AFP head 16 is capable of placing the fiber strip on a molding. This range of motion will be referred to hereinafter as the "range of motion for fiber placement".

Referring to FIG. 1, the AFP system 10 comprises a control unit 36 (shown in a control cabinet) configured for executing preprogrammed instructions that define an AFP layup. Typically, the layup instructions will cause the AFP system 10 to form a plurality of ply layers on the molding M. For each ply layer, the control unit 36 will direct the AFP system 10 to place a plurality of strips of fiber on the molding such that the strips are arranged parallel and side-by-side in a defined fiber orientation.

The control unit 36 broadly comprises one or more control processors and one or more memory modules storing processor-readable control instructions configured to be executed by the control processor(s) for controlling the AFP system. The control unit 36 further comprises input/output (I/O) components that enable the control unit to communicate with components of the AFP system 10. For example, the I/O components enable the control unit 36 to send instructions to the robot 18 that cause the robot to move the AFP head 16 along a plurality of predefined fiber placement paths, to send instructions to the fiber storage facility 12 and fiber conveyor 14 that cause the storage facility and conveyor 14 to convey fiber tows to the AFP head 16 at a feed rate appropriate for the AFP process, and send instructions to the AFP head 16 that cause the AFP head to place fibers according to the AFP layup instructions. The I/O components also provide feedback from the AFP process components to the control unit 36.

Some AFP manufacturing applications, especially aerospace applications, have stringent certification requirements. Every fiber ply must be certified by a trained inspector to be free of unacceptable defects. The conventional process for certification requires the trained inspector to personally conduct a visual inspection of each fiber ply to determine whether there are any unacceptable defects. Typically, the inspector visually assesses whether there are any gaps, overlaps, twisted tows, cumulative gaps, splices, or foreign object debris that are visible to the naked eye and then determines whether the defect is acceptable or unacceptable by reference to established defect tolerances. This manual inspection and certification process is disruptive and adds considerable cost and time to every AFP-manufactured part. The industry has made attempts to use nondestructive testing instruments to provide real time feedback on defects in the AFP process, but such attempts have not provided automated in-process inspection systems that are sufficiently reliable to meaningfully reduce the cost and time expended on manual ply inspections. The in-process inspection system 20 of the present disclosure substantially improves the state of the art by providing consistent, reliable in-process feedback identifying defects in the AFP layup. The in-process inspection system 20 can pre-flag defects so that the trained inspector can make a visual inspection of each ply much more quickly than the conventional process. Moreover, the in-process inspection system 20 of the present disclosure enables substantial automation of AFP certification, leading to substantial new efficiencies in AFP manufacturing.

Referring to FIGS. 3-13, the in-process inspection tool 22 generally comprises a profiling system 50 (broadly, "a profiler") and a support bracket 52 configured for operatively mounting the profiling system on the AFP head 16. In a primary embodiment, the profiling system 50 comprises first and second profilers 50A, 50B, each configured to output a signal indicating a surface profile of the fiber strip immediately after the compaction roller 30 compacts the fiber strip onto the molding. The support bracket 52 is configured to mount the profilers 50A, 50B for movement with the AFP head 16 along an entirety of the AFP system's range of motion for fiber placement and so that the profilers can output the in-process inspection profile data (for the entire width of the fiber strip) anywhere along the system's range of motion for fiber placement. Moreover, the support bracket 52 is configured to mount the in-process inspection tool 22 so that it does not interfere with the molding M anywhere along said range of motion for fiber placement. In general, the profiling system 50 can comprise any type of non-destructive testing instrument that is configured to output an indication of the two-dimensional surface profile of the fiber strip as it is compacted onto the molding M.

The illustrated in-process inspection tool 22 uses two laser profilers because the inventors believe the two profilers provides an advantageous balance between measurement capability and form factor. In one exemplary embodiment, the AFP head 16 is configured to place eight fiber strips with a width of 0.25 inch, having a total width of 2 inches. In an example, each profiler 50A, 50B comprises a Keyence LJV-7080 profiler. The Keyence LJV-7080 profiler emits a laser beam that has a scanning width in an inclusive range of 0.98 inches to 1.54 inches, depending on distance from the target surface being profiled. However, it will be understood that other profilers may be used without departing from the scope of the present disclosure.

Figure 6:
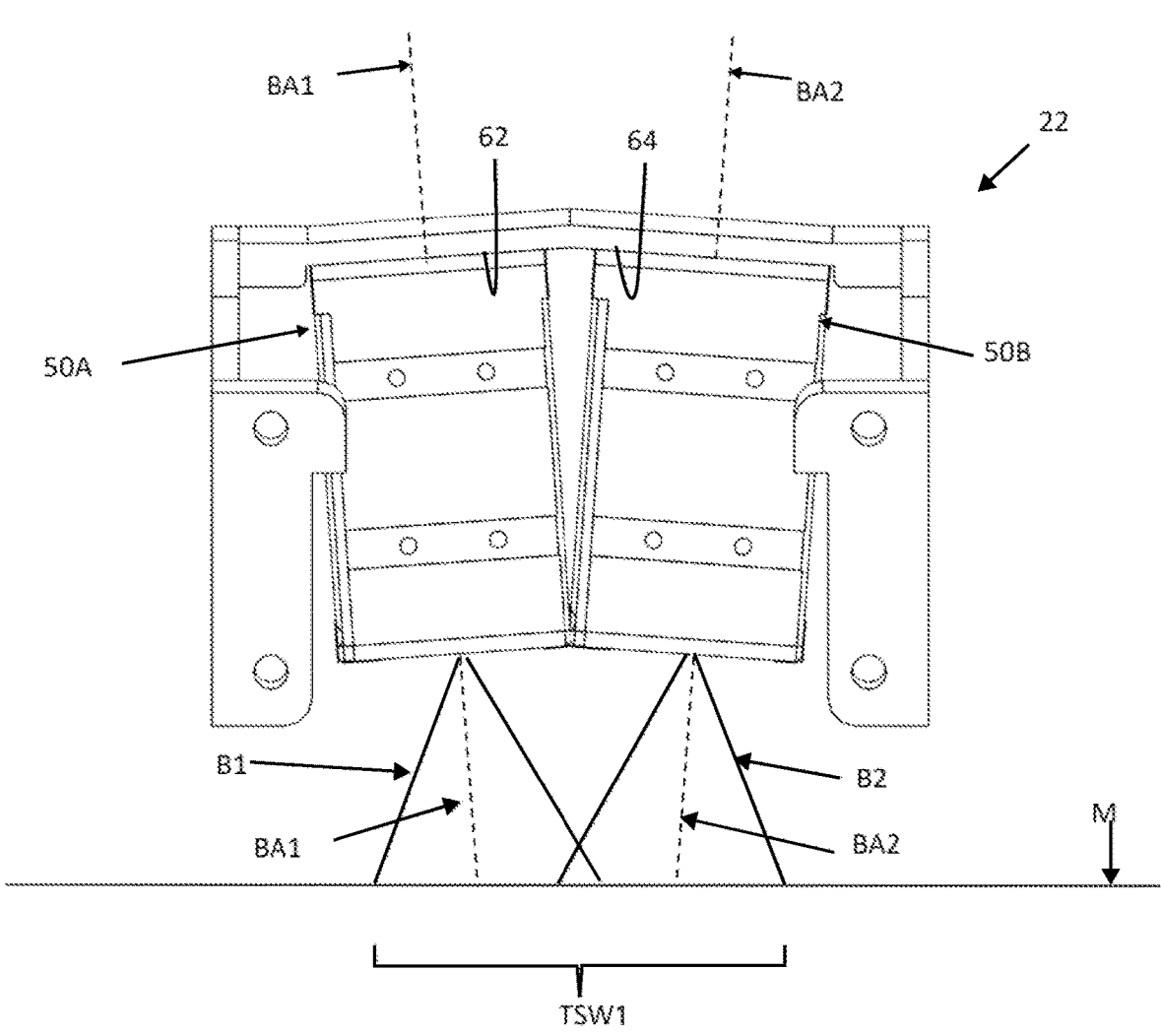
FIG. 6 is a rear elevation of the inspection tool.
Figure 7:
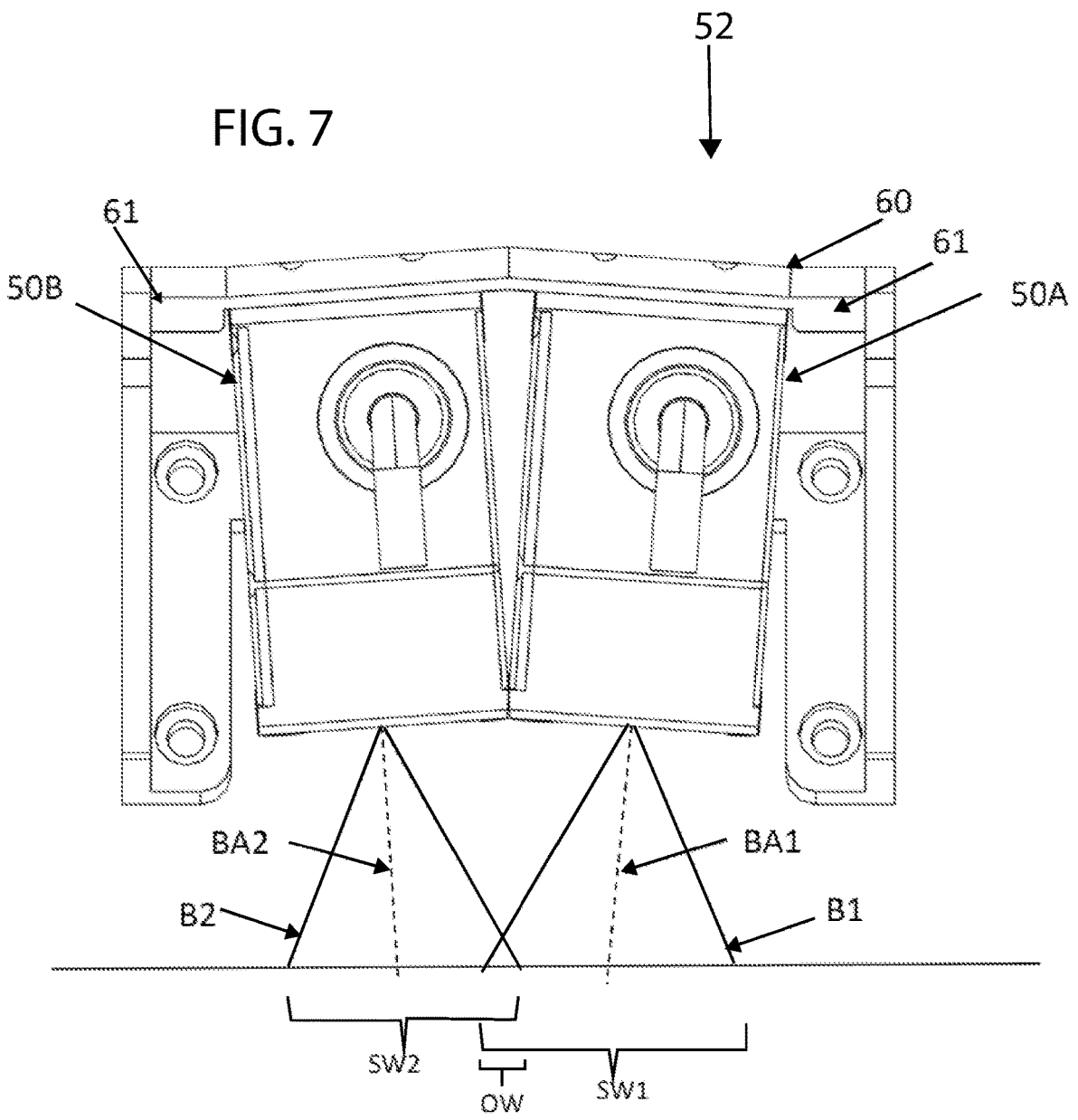
FIG. 7 is a front elevation of the inspection tool.

The support bracket 52 is configured to mount the profilers 50A, 50B on the AFP head 16 so that profilers are side-by-side and are angled so that the laser beams converge at the fiber strip. Referring to FIG. 6, the first laser profiler 50A is configured to emit a first laser beam B1 having a first beam axis BA1. The second laser profiler 50B is configured to emit a second laser beam B2 having a second beam axis BA2. FIG. 6 schematically illustrates, the in-process inspection tool 22 having a total scanning width TSW1 extending widthwise from the outer edge of where first laser beam B1 intersects the molding M to the outer edge of where the second laser beam B2 intersects the molding. The total scanning width TSW1 encompasses a first scanning width SW1 of the first laser beam B1 emitted by the first profiler 50A, a second scanning width SW2 of the second laser beam B2 emitted by the second profiler 50B, and an overlap width OW along which the first and second laser beams overlap (FIG. 7). In one or more embodiments, the overlap width OW is always within an inclusive range of from about 0.25 in to 0.35 in along the entire range of motion for fiber placement.

Figure 8:
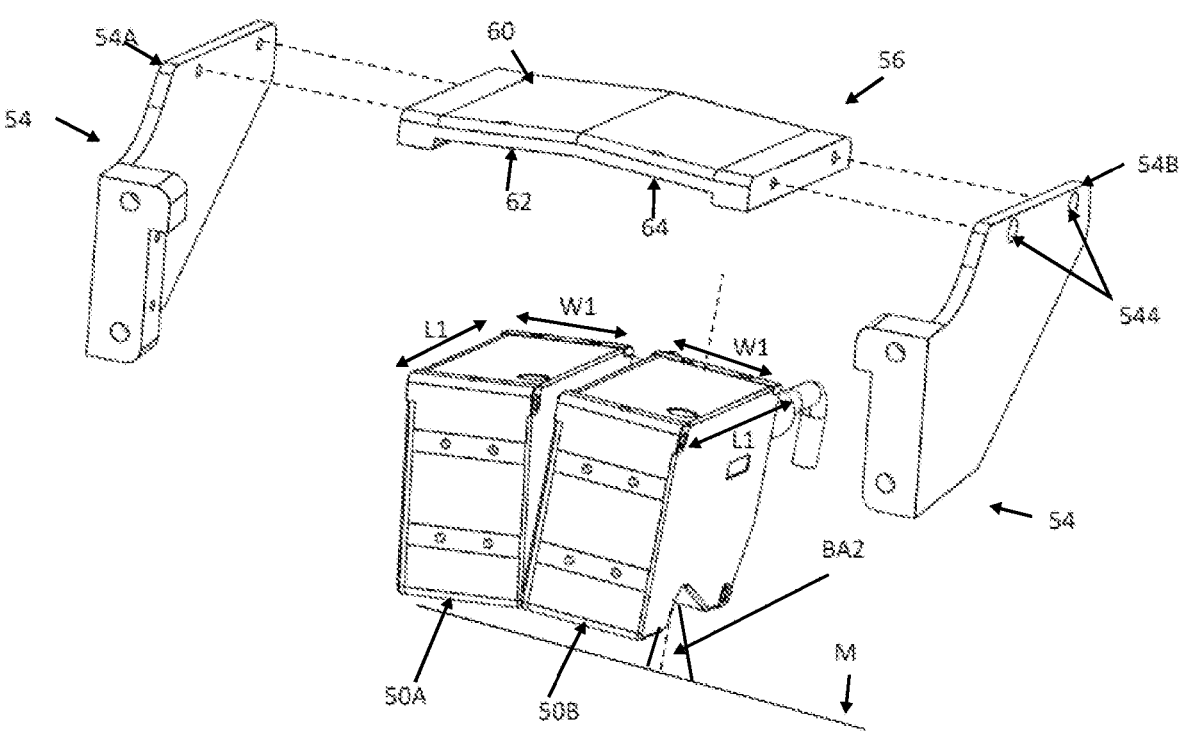
FIG. 8 is an exploded perspective of the inspection tool.

Referring to FIGS. 6-8, each profiler 50A, 50B, includes a protective housing for protecting internal components of the profiler. Each profiler includes an upper and an opposite lower side from which the profiler emits its respective beam. (Here, the terms 'upper' and 'lower' are being used to describe the relative location of parts as seen in FIGS. 6-8, with the understanding the overall orientation of the tool can vary from what is shown during use.) The upper side of each profiler is generally rectangular, having a length L1 and a width W1 located along a respective upper side plane. The upper side of each profiler includes threaded blindholes, (broadly, "attachment points"), for mounting to a support. FIG. 6 illustrates each profiler 50A, 50B emitting its respective beam B1, B2, and each beam spans a respective scanning width SW1, SW2, as described above. Each beam axis BA1, BA2 is oriented perpendicular to the width W1 of the top side of the respective profiler housing (FIG. 6). By contrast, each beam axis BA1, BA2 is oblique to the length L1 of the respective top side, (as best shown in FIG. 8).

In the example embodiment in which the Keyence LJV-7080 profilometers are used, the protective housing of the profiler may interfere with that of the second profiler, causing a 0.5-inch blind spot. Without adjustment, these two profilometers have a total scanning width of 1.5 inches, wherein a middle 0.5-inch portion of the overall 2-inch layup is not scanned. In an exemplary embodiment, a 4-degree tilt is placed on each profilometer, angling the two profilometers toward each other.

Figure 14:
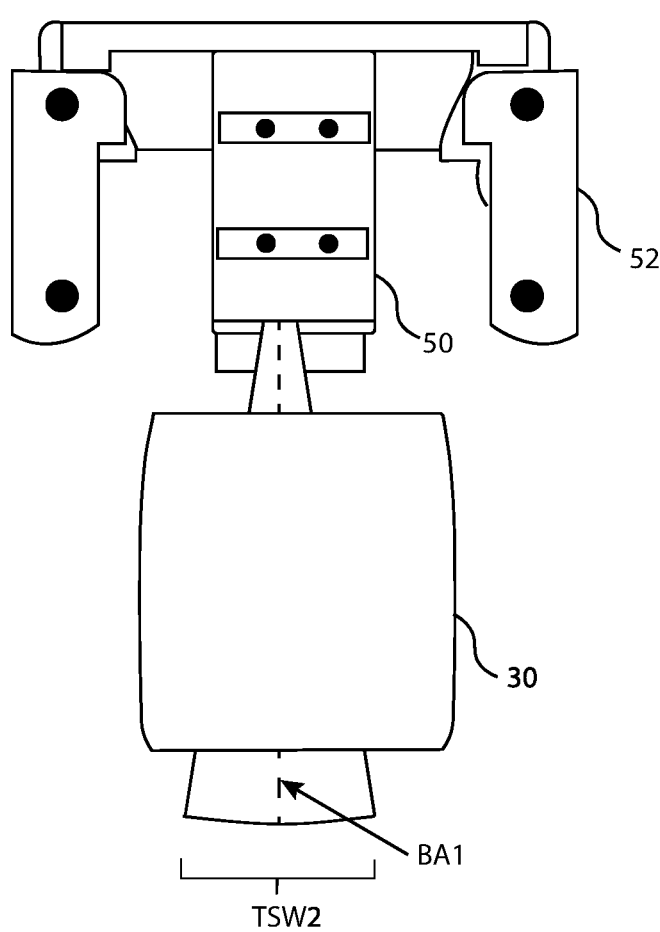
FIG. 14 is a rear elevation similar to FIG. 6 showing another embodiment of the inspection tool.

Referring to FIG. 14, in an alternative embodiment, the profiling system comprises only one profiler 50. The support bracket is configured to mount the profiler 50 on the AFP head such that the profiler is centered with respect to the roller 30 and has a total scanning width TSW2. The total scanning width TSW2 is less than that of the total scanning width TSW1 of the primary embodiment in which there are two or more profilers mounted on the AFP head by the support bracket. In an example embodiment, the single profiler is a Keyence LJV-7080 profiler, having a total scanning width TSW1 of up to 1 inch. This embodiment is most applicable in smaller-scale manufacturing operations, in which fewer fiber strips are used, or fiber strips having a smaller width are used, resulting in an absence of need for a larger total scanning width. However, it should be noted that other shapes, brands, and suitable profilers may be used without departing from the scope of the present invention.

Figure 13:
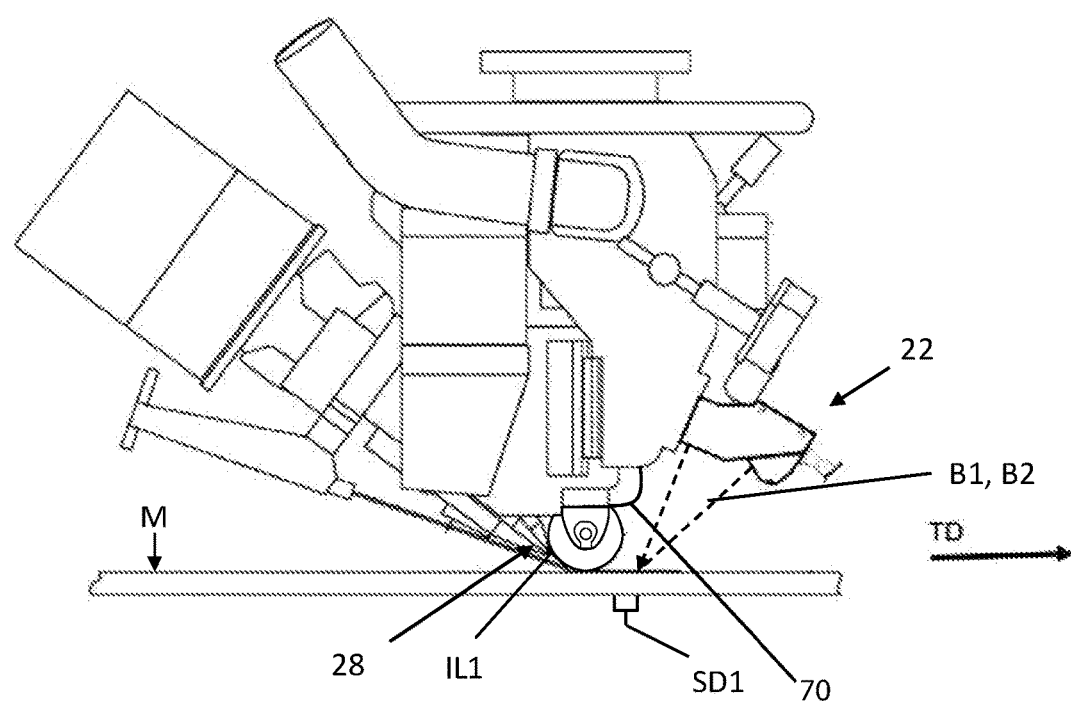
FIG. 13 is a schematic of a right-side elevation of the inspection tool mounted on an AFP head, similar to FIG. 2.

Referring again to FIGS. 3-8, the support bracket 52 is configured to mount the tool 22 on the AFP head so that the profilers 50A, 50B are able to output an in-process inspection signal representing the surface profile of a fiber strip as the AFP head places the fiber strip on the molding. In the illustrated embodiment, the support bracket 52 comprises a bracket mount 54 for mounting the support bracket on the AFP head 16 and a profiler mount 56 for mounting the profilers 50A, 50B on the support bracket. As will become apparent, the support bracket 52 is configured to mount the profilers so that the beam axes BA1, BA2 intersect the fiber strip at a location spaced apart from the compaction roller 30 in the trailing direction TD by a spacing distance SD1 in an inclusive range of from about 2.7 in to 2.95 in (FIG. 13). The support bracket 52 is sized and shaped to hold the at least one profilers 50A, 50B so that no portion of the tool 22 interferes with the molding M as the robot 18 moves the AFP head 16 along the entire range of motion for fiber placement.

Figure 9:
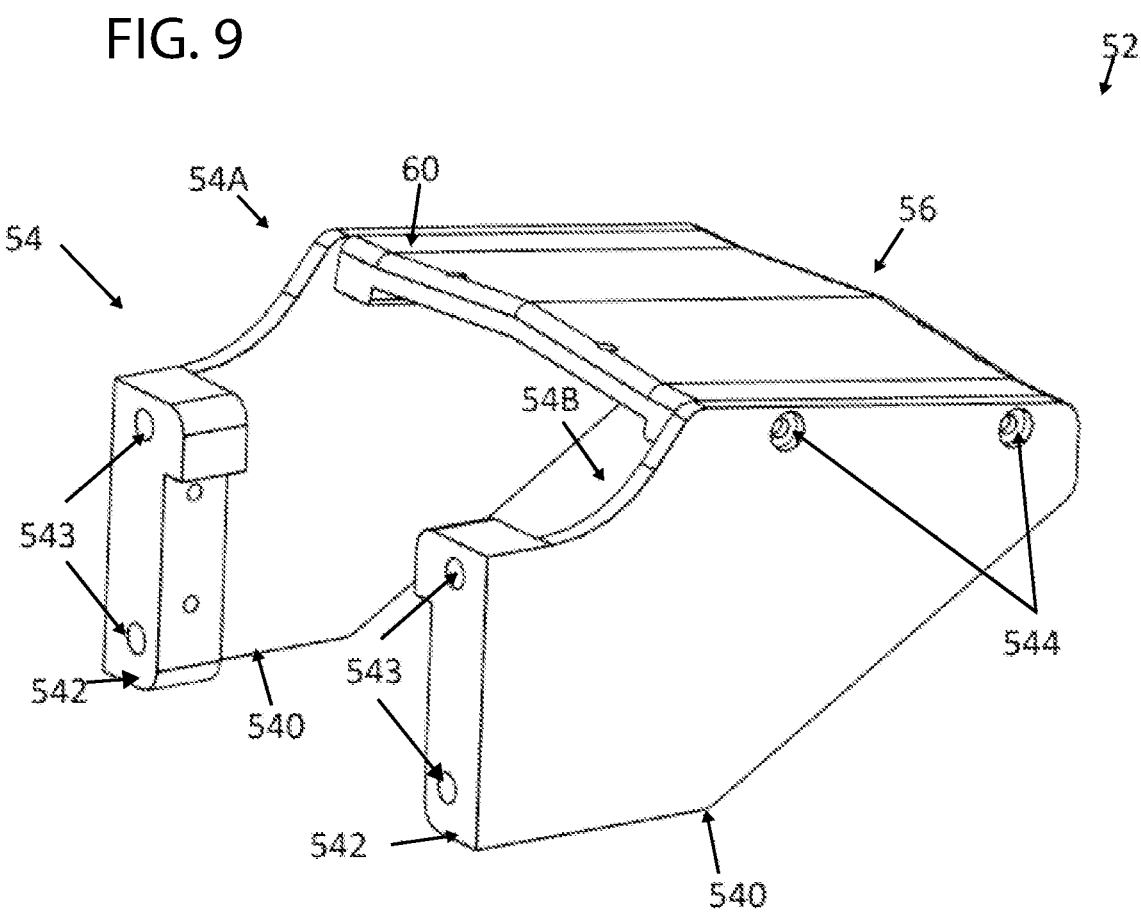
FIG. 9 is a rear perspective of a support bracket.
Figure 10:
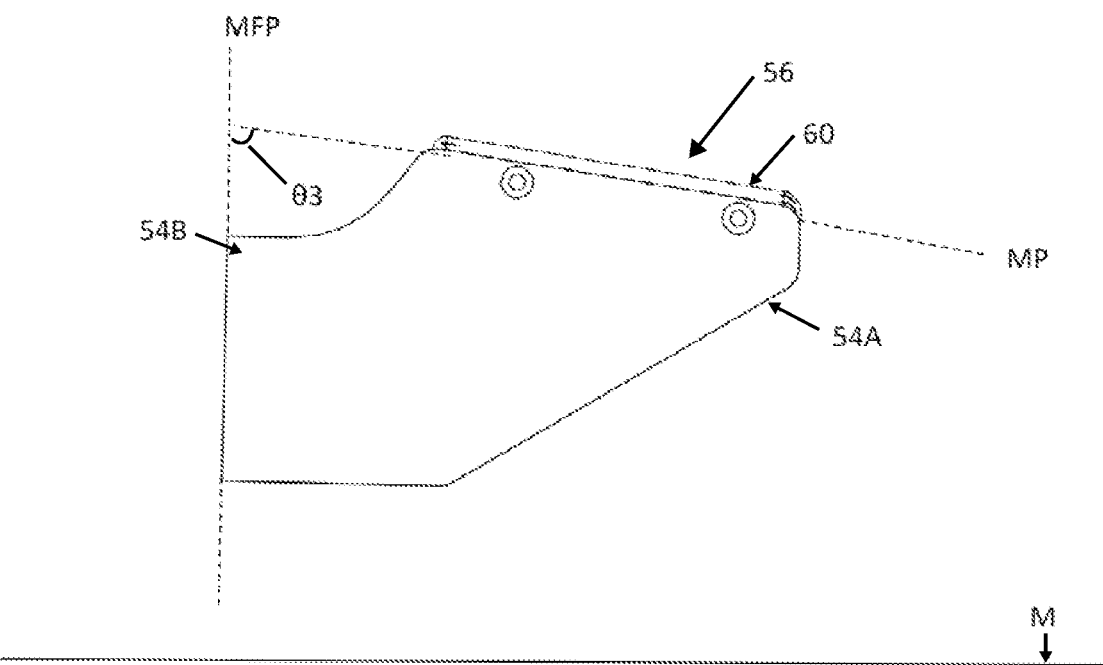
FIG. 10 is a right-side elevation of the support bracket.
Figure 11:
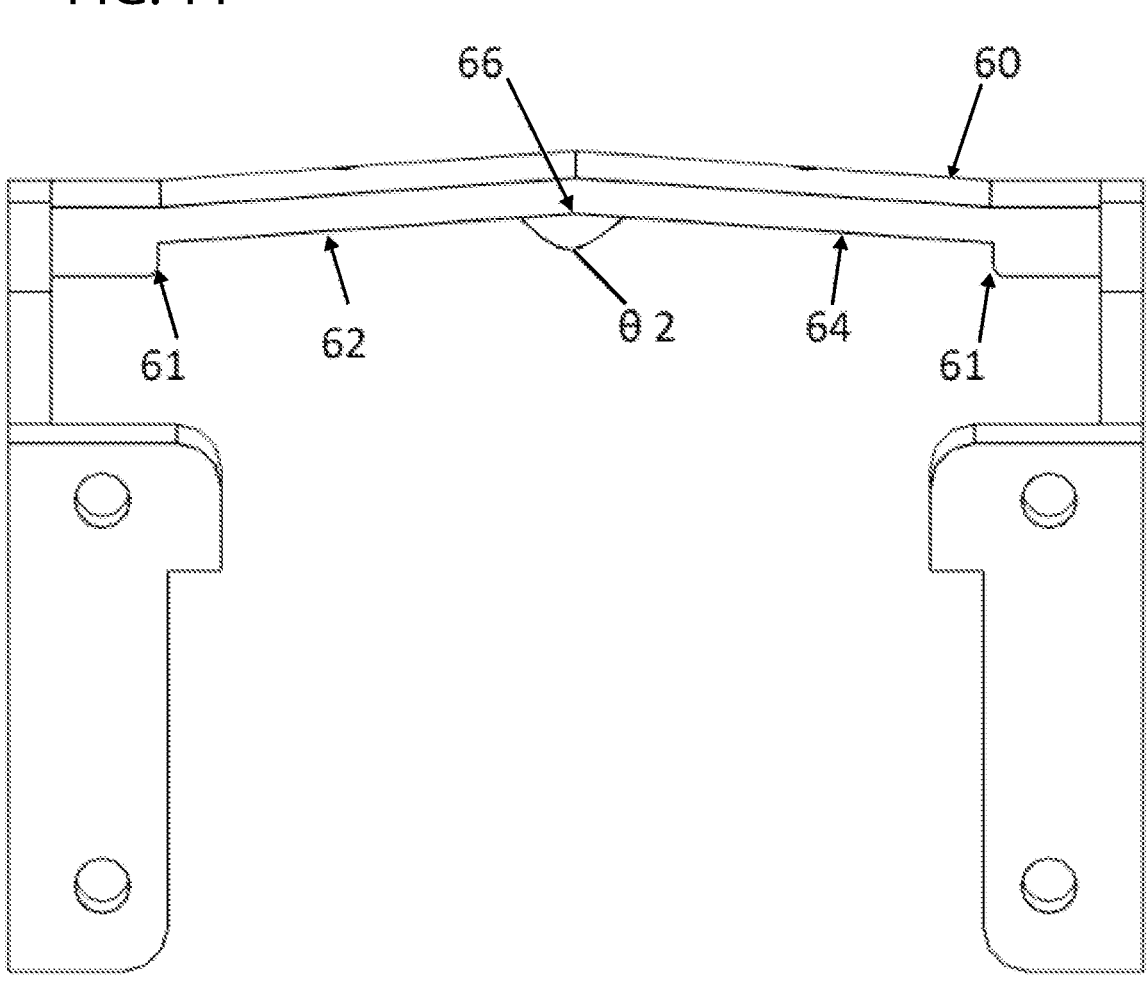
FIG. 11 is a rear elevation of the support bracket.
Figure 12:
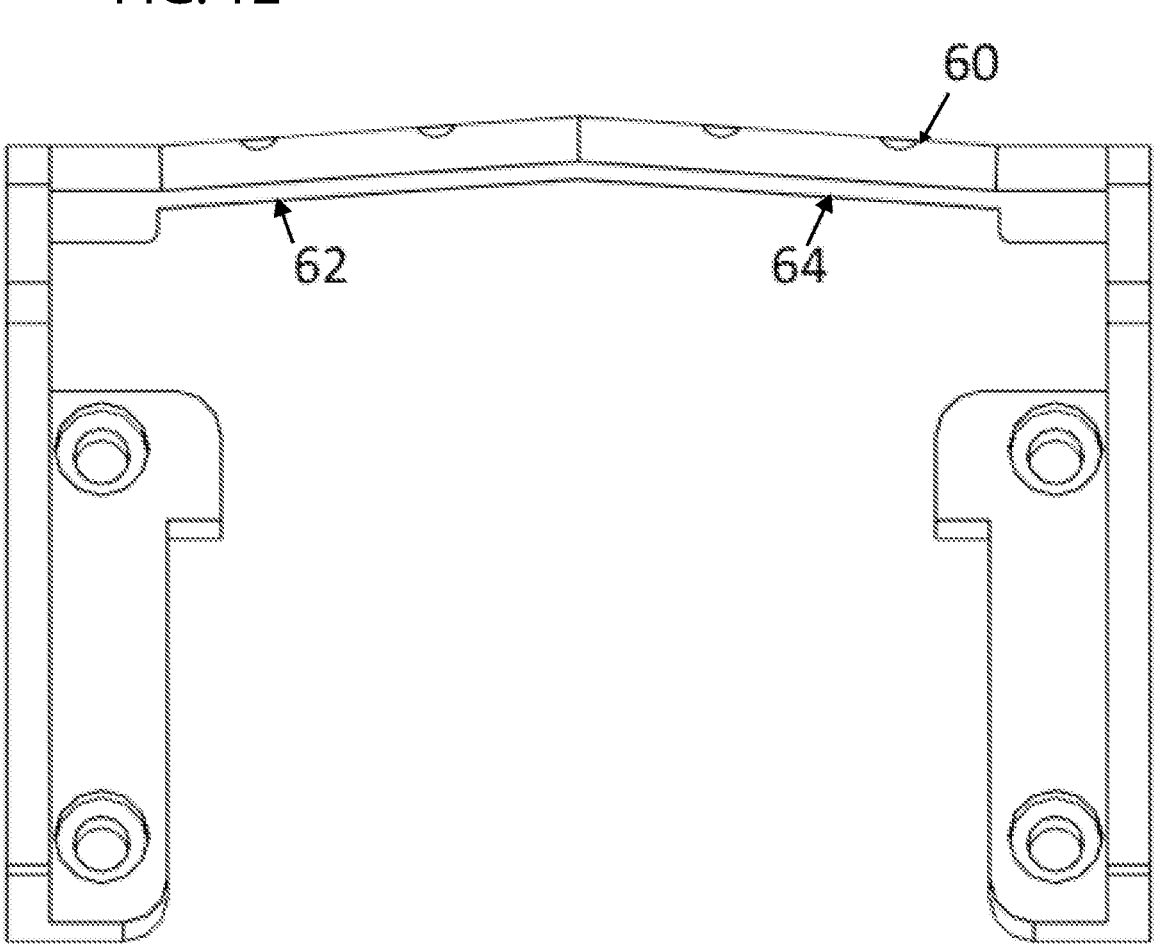
FIG. 12 is a front elevation of the support bracket.
Figure 12A:
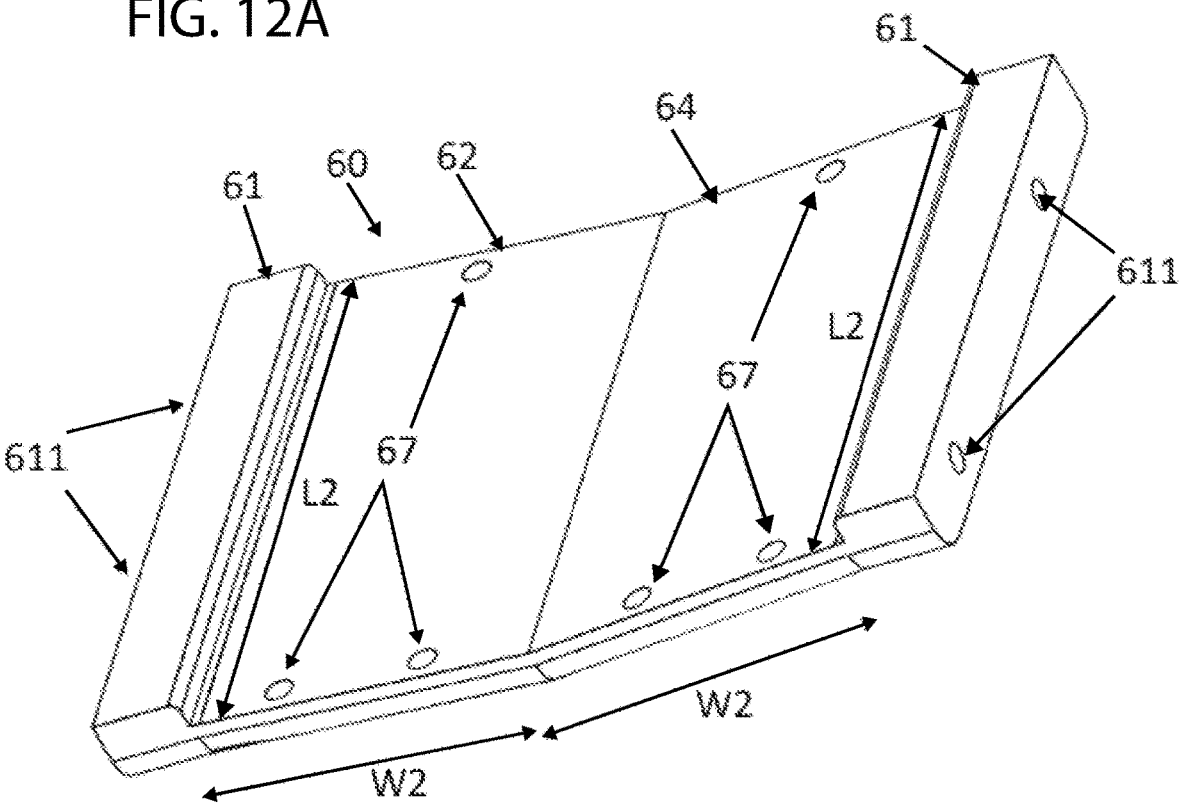
FIG. 12A is a perspective of a mounting plate of the support bracket.

Referring to FIGS. 7-11, the profiler mount 56 comprises a main profiler mounting plate 60. The mounting plate 60 is configured to position the profilers 50A, 50B in relation to the AFP head 16 to output the in-process inspection signal anywhere along the AFP system's range of motion for fiber placement. The profiler mounting plate 60 extends generally in a nominal profiler mounting plane MP, (FIG. 10). Here, the nominal mounting plane MP is defined by the lateral side edges of the main profiler mounting plate 60 such that the lateral side edges lie substantially in the profiler mounting plane MP. Referring to FIG. 12A, the mounting plate 60 comprises relatively thick attachment rails 61 that define the side edges of the mounting plate. Each attachment rail 61 comprises one or more attachment points 611 (e.g., screw holes) at which the mounting plate attaches to the bracket mount 54. Between the thick attachment rails 61, the mounting plate comprises a thinner angled plate portion having a concave mounting side configured to face the molding M. In the primary embodiment, the mounting plate 60 is configured to mount the profilers 50A, 50B on the mounting side of the plate portion between the attachment rails 61. Referring to FIG. 11, between the attachment rails 61, the mounting plate 60 comprises a first (planar) plate section 62 and a second (planar) plate section 64 joined to the first plate section at a vertex 66. The first plate section 62 and the second plate section 64 define an included angle θ2 at the vertex 66 on the mounting side of the main profiler mounting plate 60. The included angle θ2 is less than 180°. For example, in one or more embodiments, the included angle θ2 is in an inclusive range of from 160° to 178°(e.g., an inclusive range of from 164° to 176°, or an inclusive range of from 170° to 174°. In the illustrated embodiment, the angle is 172°.

Referring again to FIG. 14, the mounting plate 60 is configured to mount the single profiler on the mounting side of the plate portion between the attachment rails 61. The profiler is configured such that it is centered on the mounting plate.

Referring to FIGS. 8 and 12A which illustrate the primary embodiment, each plate section 62, 64 defines a set of attachment points 67 (e.g., screw holes) that correspond with the locations of the attachment points on the top side of the profilers 50A, 50B so that the profilers can be fastened to the plate sections 62, 64 (e.g., using screws) at the corresponding attachment points. Each plate section 62, 64 includes a length L2 that is about the same as the length L1 of the top side of the respective profiler 50A, 50B, and a width W2 that is slightly greater than the width W1 of the top side of the respective profilers 50A, 50B. This configuration allows the top side of each profiler 50A, 50B to be fastened to the mounting side of a respective plate section 62, 64 at an angle for beam convergence, but without physical interference between the profiler housings. As shown in FIG. 7, the mounting plate 60 mounts the profilers 50A, 50B so that the upper outer corners of the profilers 50A, 50B are immediately adjacent the attachment rails 61 and the upper inner corners of the profilers are separated laterally by a gap. By contrast, the lower inner corners of the profilers are immediately adjacent one another. Because of the angle θ2 between the first plate section 62 and the second plate section 64, the profilers 50A, 50B are mounted so that the beam axes BA1, BA2 converge and the beams B1, B2 overlap.

Referring to FIGS. 8 and 9, the bracket mount 54 comprises at least one bracket mount element. In the primary embodiment the bracket mount comprises first and second bracket mount elements 54A, 54B. Each bracket mount element 54A, 54B comprises a leg portion 540 and a foot portion 542 transverse to (e.g., perpendicular to) the leg portion. Each leg portion 540 defines one or more attachment points 544 (e.g., screw holes) positioned to correspond with the attachment points 611 on the attachment rails 61 of the mounting plate 60, enabling attachment of the bracket mount elements 54A, 54B to the mounting plate via screws or other removable fasteners. Each leg portion 540 has a span extending from the attachment points 544 to the foot portion 542. As explained in further detail below, each foot portion 542 is configured to couple directly to the chassis 26 of the AFP head 16. The span of each leg portion 540 is configured so that the profiler mount 56 can mount the tool 22 on the chassis 26 of the AFP head (i) with minimal protrusion from the existing envelope of the AFP head and (ii) so that the at least one profiler 50A, 50B can direct the profiling beams B1, B2 to the fiber strips at any location along the range of motion for fiber placement of the AFP system 10.

Each mounting foot 542 has a proximal side configured to engage a chassis of the AFP head and a distal side opposite the proximal side. The mounting foot extends substantially in a mounting foot plane MFP. As shown in FIG. 10, the mounting foot plane MFP and the profiler mounting plane MP define an included angle θ3 in an inclusive range of from 60° to 120°. The illustrated embodiment has an angle θ3 in an inclusive range of from 70° to 90°. At the illustrated angle θ3, the support bracket 52 mounts the profilers 50A, 50B so that the beams are angled toward the compaction roller 30 to intersect the compacted fiber strips at a location that is spaced apart from the compaction roller in the trailing direction by a small spacing distance SD1 (FIG. 13). Each mounting foot 54B defines one or more attachment points 543 (e.g., screw holes) at which the mounting foot is configured to attach to a respective support frame element of the chassis.

Referring to FIG. 13, the in-process inspection tool can further comprise an air knife mount 70. The air knife mount 70 has a notably lower profile than conventional air knife mounts for AFP systems. The low-profile air knife mount allows remains out of the line of sight between the laser profilers and the fiber strips being laid on the molding.

Hence, the low-profile air knife enables simultaneous use of both the air knife and the in-process inspection system.

An exemplary method of using the in-process inspection tool 22 will now be briefly described. The in-process inspection tool 22 is mounted to the AFP head 16 to be used with the AFP system while the AFP head is laying down fiber strips. As the AFP head is laying down the fiber strips, the in-process inspection tool scans the surface profile of each strip in real time and outputs a signal indicating the surface profile. Also in real time, the in-process inspection tool 22 is transmitting the in-process inspection signal to the automated inspection module 24. From there, the profile data is analyzed for defects such as gaps, overlays, twisted tows, cumulative gaps, splices, or foreign object debris, as described more fully in U.S. Provisional Application No. 63/484,373 filed Feb. 10, 2023, to the same Applicant, entitled "In-Process Inspection for Automated Fiber Placement," which is hereby incorporated by reference in its entirety. If a defect is detected, the defect is pre-flagged so a trained inspector can quickly make a visual inspection of the defect during a ply inspection.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided, and components may be combined. Alternatively, or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. An in-process inspection tool for an automated fiber placement (AFP) system for making a composite part, the tool comprising:
   a profiler configured to detect surface profiles; and
   a support bracket configured to mount the profiler on an AFP head of the AFP system such that the profiler is configured to output an in-process inspection signal representing a surface profile of a fiber strip as the AFP head places the fiber strip on a molding for the composite part;
   wherein the support bracket comprises a bracket mount for mounting the support bracket on the AFP head and a profiler mount for mounting the profiler on the support bracket;
   wherein the profiler mount comprises a main profiler mounting plate extending generally in a profiler mounting plane and having a mounting side on which the main profiler mounting plate is configured to mount the profiler;
   wherein the main profiler mounting plate comprises a first plate section and a second plate section joined to the first plate section at a vertex, the first plate section and the second plate section defining an included angle at the vertex on the mounting side of the main profiler mounting plate, the included angle being less than 180°.

2. The in-process inspection tool of claim 1, wherein the profiler comprises a first profiler mounted on the first plate section and a second profiler mounted on the second plate section.

3. The in-process inspection tool of claim 2, wherein the first profiler has a first scanning range and the second profiler has a second scanning range and wherein the first plate section and the second plate section mount the first profiler and the second profiler so that the first scanning range and the second scanning range overlap.

4. The in-process inspection tool of claim 1, wherein the AFP system comprises an industrial robot configured to move the AFP head along a range of motion for fiber placement and wherein the support bracket is configured to mount the profiler for movement with the AFP head along an entirety of the range of motion for fiber placement.

5. The in-process inspection tool of claim 4, wherein the support bracket is configured to mount the tool so that the tool does not interfere with the molding anywhere along the range of motion for fiber placement.

6. The in-process inspection tool of claim 1, wherein the fiber strip has a width, and wherein the in-process inspection signal represents the surface profile of the fiber strip along an entirety of the width.

7. The in-process inspection tool of claim 1, wherein the bracket mount is configured to attach to a chassis of the AFP head above a fiber roller and an air knife of the AFP head.

8. The in-process inspection tool of claim 1, wherein the bracket mount comprises a mounting foot extending generally in a mounting foot plane, the mounting foot plane being oblique to the first plate section and the second plate section.

9. An AFP system comprising:
   an AFP head comprising a chassis, a fiber guide operatively mounted on the chassis for guiding a strip of resin-impregnated fibers onto a molding, a compaction roller operatively mounted on the chassis such that the compaction roller is spaced apart from the fiber guide in a trailing direction for compacting the strip onto the molding, a heating system mounted on the chassis for heating the strip as it is compacted onto the molding;

the in-process inspection tool of claim 1, wherein the support bracket mounts the in-process inspection tool on the chassis such that the profiler is configured to transmit a profiling beam along a beam axis to the fiber strip at a location spaced apart from the compaction roller in the trailing direction.

10. The AFP system of claim 9, wherein the beam axis is angled to extend from the profiler toward the compaction roller as the beam axis extends from the profiler toward the fiber strip.

11. The AFP system of claim 9, further comprising an air knife configured to cool the compaction roller as the fiber strip is heated.

12. An in-process inspection tool for an automated fiber placement (AFP) system for making a composite part, the tool comprising:

a profiler configured to detect surface profiles; and a support bracket configured to mount the profiler on an AFP head of the AFP system such that the profiler is configured to output an in-process inspection signal representing a surface profile of a fiber strip as the AFP head places the fiber strip on a molding for the composite part;

wherein the support bracket comprises a bracket mount for mounting the support bracket on the AFP head and a profiler mount for mounting the profiler on the support bracket;

wherein the profiler mount comprises a main profiler mounting plate extending generally in a profiler mounting plane and having a mounting side on which the main profiler mounting plate is configured to mount the profiler;

wherein the bracket mount comprises a mounting foot extending generally in a mounting foot plane, the mounting foot plane being oblique to the profiler mounting plane.

13. The in-process inspection tool of claim 12, wherein the mounting foot has a proximal side configured to engage a chassis of the AFP head and a distal side opposite the proximal side, the mounting foot plane and the profiler mounting plane defining an included angle between the distal side of the mounting foot and the mounting side of the main profiler mounting plate in an inclusive range of from 70 to 90 degrees.

14. The in-process inspection tool of either of claim 12 or 13, wherein the mounting foot comprises first and second mounting feet on opposite sides of the main profiler mounting plane.

15. The in-process inspection tool of claim 12, wherein the AFP system comprises an industrial robot configured to move the AFP head along a range of motion for fiber placement and wherein the support bracket is configured to mount the profiler for movement with the AFP head along an entirety of the range of motion for fiber placement.

16. The in-process inspection tool of claim 15, wherein the support bracket is configured to mount the tool so that the tool does not interfere with the molding anywhere along the range of motion for fiber placement.

17. The in-process inspection tool of claim 12, wherein the fiber strip has a width, and wherein the in-process inspection signal represents the surface profile of the fiber strip along an entirety of the width.

18. The in-process inspection tool of claim 12, wherein the bracket mount is configured to attach to a chassis of the AFP head above a fiber roller and an air knife of the AFP head.

19. An AFP system comprising:

an AFP head comprising a chassis, a fiber guide operatively mounted on the chassis for guiding a strip of resin-impregnated fibers onto a molding, a compaction roller operatively mounted on the chassis such that the compaction roller is spaced apart from the fiber guide in a trailing direction for compacting the strip onto the molding, a heating system mounted on the chassis for heating the strip as it is compacted onto the molding;

the in-process inspection tool of claim 12, wherein the support bracket mounts the in-process inspection tool on the chassis such that the profiler is configured to transmit a profiling beam along a beam axis to the fiber strip at a location spaced apart from the compaction roller in the trailing direction.

20. The AFP system of claim 19, wherein the beam axis is angled to extend from the profiler toward the compaction roller as the beam axis extends from the profiler toward the fiber strip.

21. The AFP system of claim 19, further comprising an air knife configured to cool the compaction roller as the fiber strip is heated.

\* \* \* \* \*